R. Lighthall
Protecting Pipes &c
No. 97,657.  Patented Dec. 7, 1869.
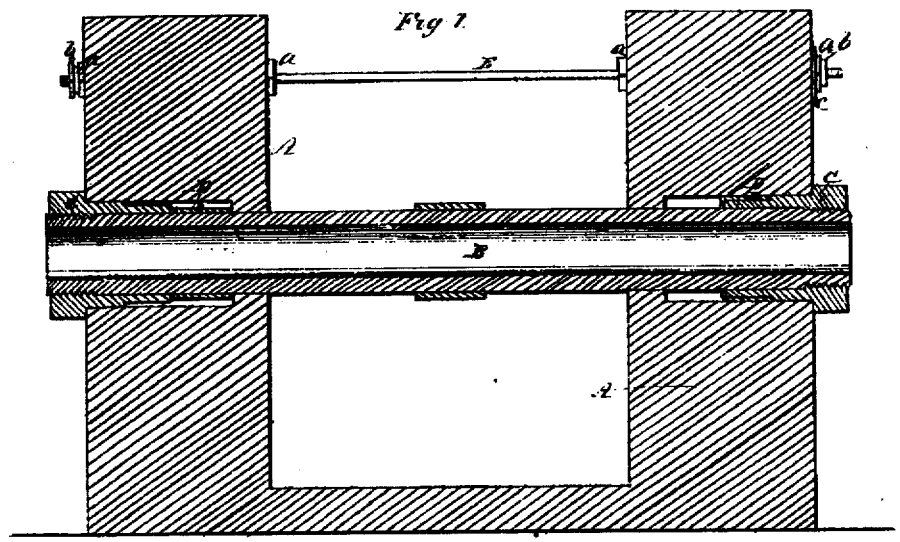
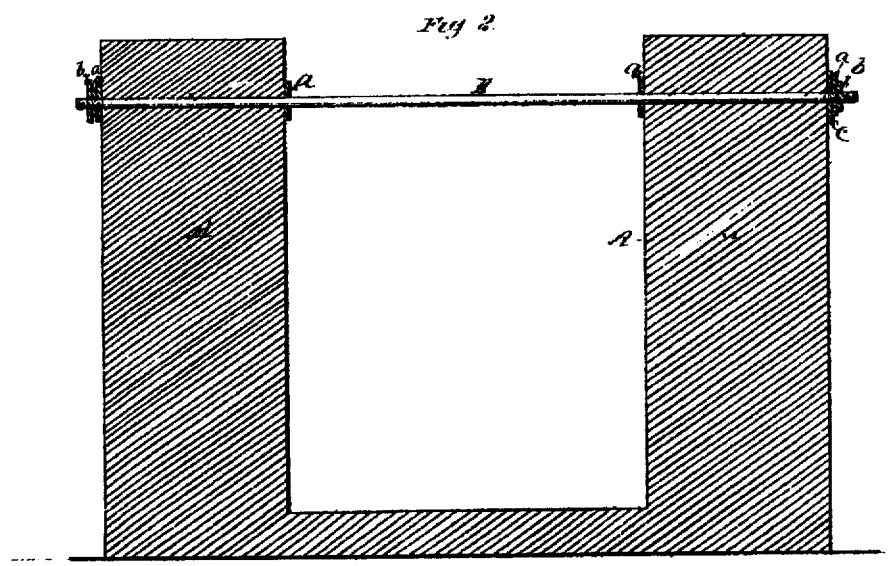
Witnesses:
Fred. Haynes
R. C. Rubsam
Reuben Lighthall

United States Patent Office.

REUBEN LIGHTHALL, OF BROOKLYN, NEW YORK.

Letters Patent No. 97,657, dated December 7, 1869.

---

IMPROVED MODE OF PREVENTING CORROSION IN PIPES, BOLTS, AND SIMILAR ARTICLES OF IRON IN SEA-WATER.

---

The Schedule referred to in these Letters Patent and making part of the same.

---

*To all whom it may concern:*

Be it known that I, REUBEN LIGHTHALL, of Brooklyn, in the county of Kings, and State of New York, have invented a new and useful Improvement in Protecting Pipes, Bolts, and other like articles or bodies, of which the following is a full, clear, and exact description, reference being had to the accompanying drawing, forming part of this specification, and in which—

Figures 1 and 2 represent sectional views of a surface-condenser, in part, with a pipe and bolt or bolts protected in accordance with my improvement.

Similar letters of reference indicate corresponding parts.

My improvement relates to the protection, from excessive or rapid corrosion, of iron pipes, bolts, and other like articles exposed to water or dampness, and is more particularly designed to be applied to connections and fastenings in or about ships, and to surface-condensers pertaining thereto, as in the case of steamships and other vessels, and it will suffice here to describe my improvement in connection therewith.

This application of the improvement is selected on account of the well-known destruction, of salt and other matter contained in sea-water, which sea-going steamships and other vessels are exposed to, causing rapid oxidation of the various iron pipes, bolts, &c., such oxidation and destruction being augmented by a certain galvanic action that takes place.

This oxidation I propose to retard or reduce by establishing, in connection with the iron pipes or bolts, a voltaic pile that will cause the galvanic action, caused by the water and different metals in contact, to be absorbed, in a measure at least, by a metal or metals which are positive to the iron, using for the purpose mainly two metals, such, for instance, as zinc and tin, though copper may be used in addition, but preferably zinc and tin, on account of their approximation to each other and to iron in the galvanic scale, thereby producing only a gentle concentration of the galvanic action or current on them to the protection of the iron.

In this way I transfer, in a measure, the oxidation to the zinc and tin, without however using these metals otherwise than at points which would on many accounts be objectionable and impracticable.

In illustration, A A, in the accompanying drawing, represent the walls of a surface-condenser, and B, one of its iron pipes which it is desired to protect.

Connected with said pipe, at or near either end, or intermediately of its length, as may be, is a voltaic pile, consisting, for instance, (in connection with the iron,) of a zinc nut, C, and tin sleeve D, which may be variously shaped, or arranged as shown.

In case of a bolt, as at E, the same or like protection is afforded to the iron by employing zinc and tin washers or nuts, *a b*, with or without a copper plate or washer, *c*.

What is here claimed, and desired to be secured by Letters Patent, is—

The combination with or application to iron pipes, bolts, and other like bodies, of plates, nuts, sleeves, or washers surrounding them at intervals, and composed of different metals approximating each other and the iron in corrodibility, substantially as and for the purpose or purposes herein set forth.

REUBEN LIGHTHALL.

Witnesses:
 FRED. HAYNES,
 HENRY PALMER.